(12) United States Patent
Van Eijndhoven et al.

(10) Patent No.: US 6,397,235 B1
(45) Date of Patent: May 28, 2002

(54) DATA PROCESSING DEVICE AND METHOD OF COMPUTING THE COSTINE TRANSFORM OF A MATRIX

(75) Inventors: Josephus T. J. Van Eijndhoven, Waalre; Fransiscus W. Sijstermans, Mountain View, both of (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/270,438

(22) Filed: Mar. 16, 1999

(30) Foreign Application Priority Data

Mar. 18, 1998 (EP) .............................. 98200867

(51) Int. Cl.⁷ .............................................. G06F 17/14
(52) U.S. Cl. ...................................... 708/401; 708/402
(58) Field of Search .............................. 708/401, 402; 712/22, 221

(56) References Cited

U.S. PATENT DOCUMENTS

| | | | |
|---|---|---|---|
| 5,638,068 A | 6/1997 | Nickerson | 341/67 |
| 5,754,457 A | 5/1998 | Eitan et al. | 364/725.03 |
| 5,893,145 A * | 4/1999 | Thayer et al. | 708/401 |
| 6,092,920 A * | 7/2000 | Sakamoto | 708/401 |
| 6,119,140 A * | 9/2000 | Murata et al. | 708/401 |

FOREIGN PATENT DOCUMENTS

| | | | |
|---|---|---|---|
| WO | 9731308 | 8/1997 | G06F/3/14 |
| WO | WO9731308 | 8/1997 | G06F/3/14 |
| WO | WO9733236 | 9/1997 | G06F/17/14 |

OTHER PUBLICATIONS

"Practical Fast 1–D DCT Algorithms with 11 Multiplications", Proceedings International Conference on Acoustics, Speech and Signal Processing 1989 (IC–IASSP '89) pp. 988–991.

* cited by examiner

Primary Examiner—David H. Malzahn

(57) ABSTRACT

A data processing device provides for registers which can be formatted as segments containing numbers to which operations can be applied in SIMD fashion. In addition it is possible to perform operations which combine different segments of one register or segments at different positions in the different registers. By providing specially selected it is thus made possible to perform multidimensional separable transformations (like the 2-dimensional IDCT) without transposing the numbers in the registers.

9 Claims, 4 Drawing Sheets

DATA PROCESSING DEVICE AND METHOD OF COMPUTING THE COSTINE TRANSFORM OF A MATRIX

The invention relates to a data processing device.

Such a data processing device is known from PCT patent application No. 97/31308. This data processing device allows for parallel processing under control of parallel instructions like SIMD instructions (Single Instruction Multiple Data). A SIMD instruction applies the same operation a number of times in parallel. The SIMD instruction typically defines two operands, normally in terms of register addresses. The content of each of these operands is treated as a plurality of segments of packed data. For example, the content of a 64-bit register may be treated as four 16 bits numbers, located at bit positions 0–15, 16–31, 32–47, 48–63 in the register respectively. When the data processing device encounters the SIMD instruction, the same operation is applied to several different pairs of numbers from the operands in parallel. For example, the content of bit positions 0–15 in a first operand register is added to the content of bit positions 0–15 in a second operand register, the content of bit positions 16–31 in a first operand register is added to the content of bit positions 16–31 in a second operand register and so on.

The SIMD instructions can be used to reduce the number of instructions that needs to be executed to perform a given function. For example, consider the function of performing a discrete cosine transform (IDCT) of individual columns of a block of pixel values. The pixel values of different rows of the blocks are stored in different operands. In each operand, the pixel value is stored in a segment at a position determined by its column. Thus, a first register might contain a pixel value from a first row, first column at bit positions 0–15, and a pixel value from the first row, second column at bit positions 16–32 and so on. A second register might contain pixel values from a second row, pixel values from different rows being stored in the same way according their column. As a result execution of a series of instructions that code for the operations for applying the IDCT to one column automatically performs the IDCT for a number of columns in parallel if the arithmetic operations are all performed using SIMD instructions. This reduces the number of instructions that needs to be executed.

In case of a separable two-dimensional IDCT the one dimensional IDCT needs to be applied to individual columns and to individual rows of the block. In this case a similar reduction in the number of instructions can be obtained when the roles of rows and columns are interchanged between the transformation of the columns and the transformation of the rows. The roles of rows and columns can be interchanged by means of transposition of the block. Transposition brings different pixel values of a column into the same register instead of different pixel values from the same row. Transposition involves moving the content of corresponding positions (corresponding to the same column) from different registers to different positions in another register. Unfortunately, transposition itself requires execution of a considerable number of additional instructions. As a result the two dimensional transform requires more than twice the number of instructions needed for the one dimensional transform.

This limitation on the advantage of SIMD occurs more generally if functions have to be programmed that require the combination of data from noncorresponding positions in the packed data. In this case one cannot use SIMD parallelism to treat content of operands as a packed format containing independent numbers, or at least additional operations are needed to reshuffle the data before SIMD operations can be used.

It is an object of the invention to provide for a processing device as set forth in the preamble which makes it possible to reduce the number of instructions that needed to be executed even further.

Thus it is possible to program parallel operations that make mutually different combinations of segments of the operands, combining segments at positions in the operands that are not equal to each other or using mutually different operations. This in contrast to the prior art SIMD instructions which apply the same operation to each time to a pair of segments located at identical positions. For example, an instruction according to the invention might cause the number stored at bit positions 0–15 of an operand register to added to the number stored at bit positions stored at bit positions 16–31 in parallel with adding of the numbers stored at bit positions 32–47 and the number stored at bit positions 48–63.

One may provide instructions both for operations that combine segments located in the same operand register and for operations that combine segments located in different operand registers. Any one or more segments may be used in more than one operation. The operations executed in parallel may all be the same type of operation, say all additions, or they may be mutually different operations, say additions and subtractions.

Usually, only a very limited set of application specific instructions for combining segments will be provided in addition to SIMD instructions. For example, when an instruction is available which provides for an operation like addition between certain segments at different positions, it is not necessary to provide a set of instructions which program for that operation between all possible pairs of segments. Similarly, if an instruction is available which combines certain pairs of segments each with its own operation (at least one of the operations being different from the others) then is not necessary to provide an instruction set for all possible combinations of operation applied to those segments. For any given application one needs to provide only a small fraction of all possible operations or combinations of operations and/or a small fraction of all possible combined segments.

For a separable two-dimensional transformation on a block the invention makes it possible to reduce the number of required instructions without transposing the block. Each register may still contain different pixel values from one row, with different register storing pixel values from the same column in the same segment. Then the transformation of the columns will still be performed using SIMD instructions, but the transformation of the rows is performed by means of parallel operations that combine pixel values from the same row, located in different segments.

For example, one might provide an IDCT instruction which computes the IDCT of an entire row from pixel values of that row stored in the different segments of the operand registers referred to in the IDCT instruction. Also one might provide operations which compute the sum and difference of the contents of pairs of different segments in a register. This is a type of operation that is typically required in an IDCT transforms and similar transforms.

These and other advantageous aspects of the invention will be described in a non-limitative way using the following figures.

Figure 4A:
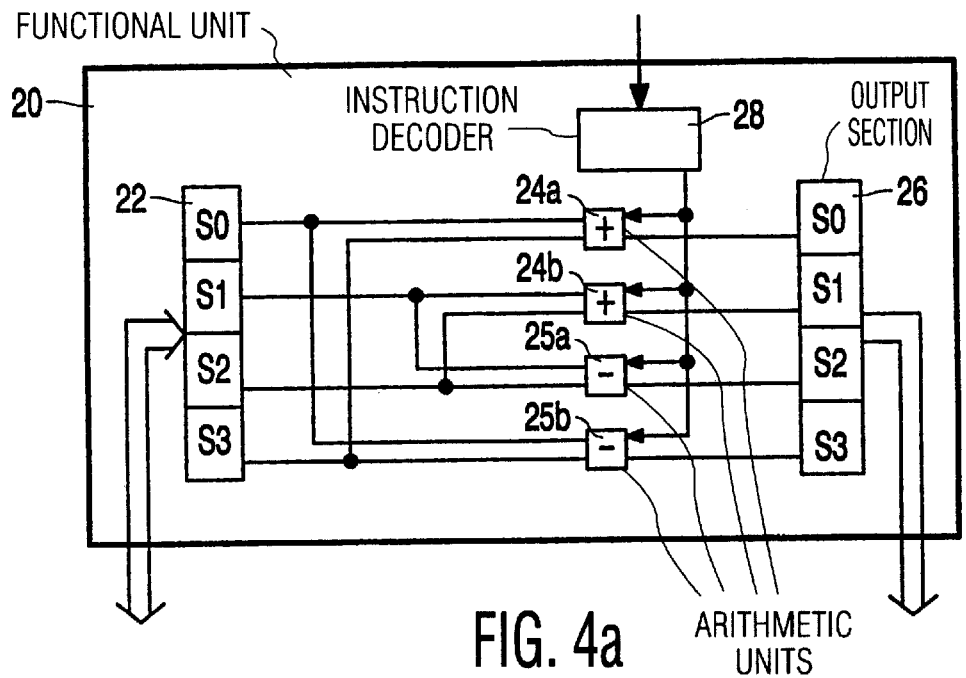

FIGS. 4a,b show a functional units for executing an instruction according to the invention.

Figure 1:
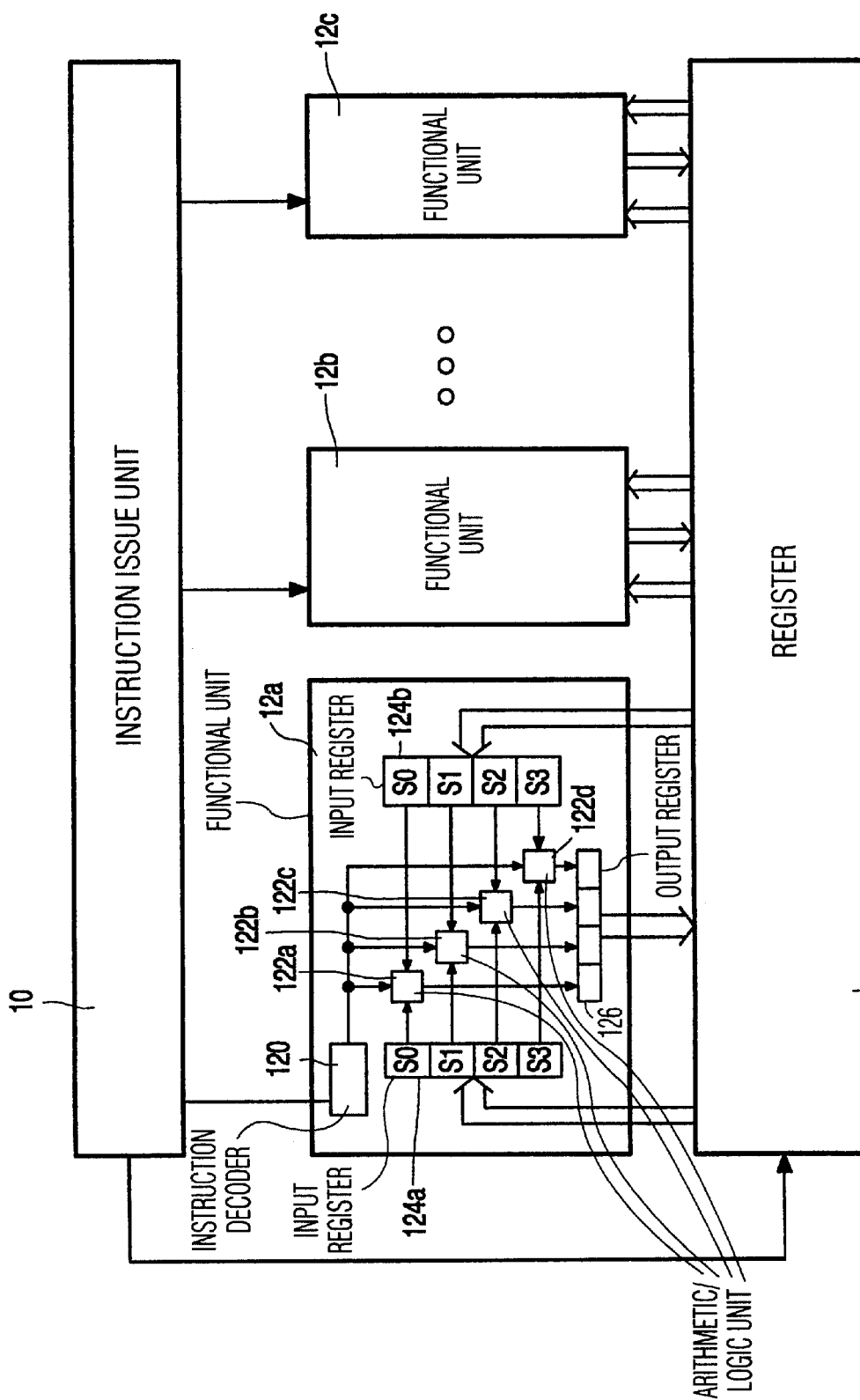
FIG. 1 shows a data processing device.

FIG. 1 shows a VLIW type (Very Long Instruction Word) data processing device. Although the invention is illustrated using a VLIW type device, it is not limited to such a device. The device contains an instruction issue unit 10, a number of functional units 12a–c and a register file 14. The instruction issue unit 10 has an instruction output coupled to the functional units 12a–c and the register file 14. The register file 14 has read/write ports coupled to operand inputs/outputs of the functional units 12a–c.

One functional unit 12a is shown in more detail. This functional unit 12a contains an instruction decoder 120, a number of ALU's (Arithmetic/Logic units) 122a–d, a first and second input register 124a,b and an output register 126. The instruction decoder is connected to the ALU's 122a–d. The input registers 124a,b are divided into a number of segments. The segments of the first and second input registers 124a,b are connected to the ALU's 122a–d.

In operation, the instruction issue unit 10 accesses the successive instructions of a program and issues these instructions to the functional units 12a–c. An instruction issued to a functional unit 12a–c typically contains an opcode, two source register addresses and a result register address (these elements of the instruction are not necessarily issued simultaneously). The opcode defines the operation or operations that the functional unit 12a–c must perform. The source register addresses refer to registers in the register file 14 where the operands are stored upon which this operation or operations must be performed. The instruction issue unit 10 applies these addresses to the register file 14. The result register address refers to the register in the register file 14 where the result of the operation or operations must be stored. The instruction issue unit 10 applies the result register address to the register file 14.

Most functional units 12a–c treat the content of each register as one number. E.g. if the register is made up of 64 bits, its content is treated as a 64 bit number that can be added to other 64 bit numbers, arithmetically or logically shifted etc. However, at least some of the functional units 12a–c are capable (or also capable) of treating the content of the registers as a set of numbers, stored in respective segments of the register. Special operations can be performed in parallel on these numbers, independently of one another: in such special operations carry-bits don't carry from one segment to the other and shifts don't shift bits from one segment to the other, any clipping is performed for each segment independently etc.

Functional unit 12a is a functional unit that treats the content of each register as a plurality of segments, each segment containing a separate number. For this purpose, all registers are notionally divided into segments in the same way. When an instruction is executed, the content of respective segments of the particular source registers referred to in the instruction are applied to respective ones of the ALU's 122a–d.

In case of a SIMD instruction the position of the segments at the same position in the two source operand are supplied to the same ALU 122a–d. For example, if the operand has 64 bits bit positions 0–15, 16–31, 32–47, 48–63 may constitute four segments S0, S1, S2, S3 respectively. The content of bit positions 0–15 of both operands is supplied to a first one of the ALU's 122a, the content of bit positions 16–31 of both operands is supplied to a second one of the ALU's 122b and so on. Again in case of the SIMD instruction, the instruction decoder 120 applies the same control code to all of the ALU's 122a–d. The ALU's 122a–d therefore all perform the same type of operation (e.g. addition), but on different segments.

SIMD instructions may be applied for example to compute a one dimensional transform of a number of columns of a block B of numbers $B_{i,j}$ (i=0..n, j=0..m), e.g. an 8×8 block (n=7, m=7). To do so, numbers from the same rows of the block are loaded into different segments of a register. For example, numbers $B_{0,0}$, $B_{0,1}$, $B_{0,2}$, $B_{0,3}$ are loaded into segments S0, S1, S2, S3 of a first register R1 respectively, $B_{0,4}$, $B_{0,5}$, $B_{0,6}$, $B_{0,7}$ are loaded into segments S0, S1, S2, S3 of a second register R2 respectively, $B_{1,0}$, $B_{1,1}$, $B_{1,2}$, $B_{1,3}$, are loaded into segments S0, S1, S2, S3 of a third register R3 respectively, $B_{1,4}$, $B_{1,5}$, $B_{1,6}$, $B_{1,7}$ are loaded into segments S0, S1, S2, S3 of a fourth register R4 respectively and so on.

Now assume that a program is available to perform the transformation on one column, the program being expressed in instructions which include arithmetic instructions like add, subtract, multiply etc. applied to registers which contain the numbers for one column $B_{i,j}$ i=0..n. If SIMD instructions are used for all these arithmetic instructions then this program will automatically compute the transform in parallel for a number of columns j=0..3. Thus, in case of a block with N-columns and P numbers in respective segments of each register, the program would need to be executed only N/P times to transform the N columns.

In case of a separable two-dimensional transformation, all of the columns may be transformed in this way. Subsequently the rows of the resulting transformed block must all be transformed. An example of such a two dimensional transformation is the two dimensional IDCT. In this case the transformed block $A_{i,j}$ is expressed by $$A{i,j}=2/N\ \Sigma_u\ \Sigma_v\ C_u\ C_v\ B_{u,v}\ \cos\ ((2i+1)u\ \pi/2N)\ \cos\ ((2j+1)v\pi/2N)$$

where Cu=1/sqrt(2) if u=0 and $C_u$=1 otherwise and the sums run over the integers from 0 to N−1. This two-dimensional transformation can be computed by first obtaining an intermediate block $INT_{i,v}$ by a one-dimensional transformation according to $$INT_{i,v}=\Sigma_u\ C_u\ B_{u,v}\ \cos\ ((2i+1)u\pi/2N)$$

and subsequently applying a one-dimensional transform to the intermediate block $$A_{i,j}=2/N\ \Sigma_v\ C_v\ INT_{i,v}\ \cos\ ((2j+1)v\pi/2N)$$

Thus, the two-dimensional transformation is computed as a composition of two one dimensional transformations, one transforming B into INT and the other transforming INT into A ("composition" of two transformations means that one transformation is applied to the result of applying the other transformation). In the example of the IDCT it does not matter which one-dimensional transformation is applied first: in the example one sums first along the first index u of the block $B_{u,v}$ and subsequently along the second index v, but that order may be inverted without affecting the end result.

Such a two stage two-dimensional transformation can be speeded up using SIMD instructions. When the numbers $B_{u,v}$ of the intermediate block B are stored as described in the preceding. i.e. with several numbers $B_{u,v}$ v=0, 1, 2, 3 of a row in respective segments of a register, the computation of the intermediate block $INT_{i,v}$ can be performed by transforming a number of columns (all numbers having v=0 in the first column, v=1 in the second column and so on) in parallel.

Similar parallel processing using SIMD instructions is possible if the numbers from the intermediate block INT are stored in the registers so that several number of a column are stored in one register, e.g. if the segments of a first register store $INT_{i,v}$ i=0.3, v=0, respectively, the segments of a second register store $INT_{i,v}$ i=4.7, v=0, the register of a third register $INT_{i,v}$ i=0.3, v=1 and so on. In this case a number of rows of the intermediate block INT can be transformed in parallel using SIMD instructions.

However, after the computation of the intermediate block INT from the block B, the numbers will not be stored in the register in this way, with several numbers $INT_{i,v}$ i=0.3, v=0 from one column in a register, but instead several numbers $INT_{i,v}$ i=0, v=0.3 from each row will be stored in each register. This is because the computation of the intermediate block requires separate one dimensional transformation of respective columns, whereas the computation of the final block A requires separate one dimensional transformations of respective rows.

In order to be able to use SIMD instructions for both types of transformations the intermediate block needs to be transposed: the numbers have to be regrouped over the registers. This is a complicated operation: in the example of an 8×8 block with 4-segment registers one needs 16 registers and 32 operations with two-inputs for the transposition.

The invention aims at avoiding the transposition. For the transformation of the rows the arrangement of the numbers of the intermediate block wherein registers contain different numbers from the same row is retained, and special instructions are used that combine these numbers from these registers in order to perform the one dimensional transformation in the row that is stored in these registers.

These instructions make it possible to perform a two-dimensional separable transformation without transposition. Without farther measures, the combination of such special instructions for one dimension and the SIMD type of operations for two or more further dimensions can be used to perform higher than 2 dimensional transformations as well.

In the most straightforward implementation at least one functional unit is provided that is capable of performing the entire IDCT of a row. In case of an 8-point IDCT using registers that each contain four respective numbers from a column, such an instruction would need two operand registers and two result registers.

Figure 2:
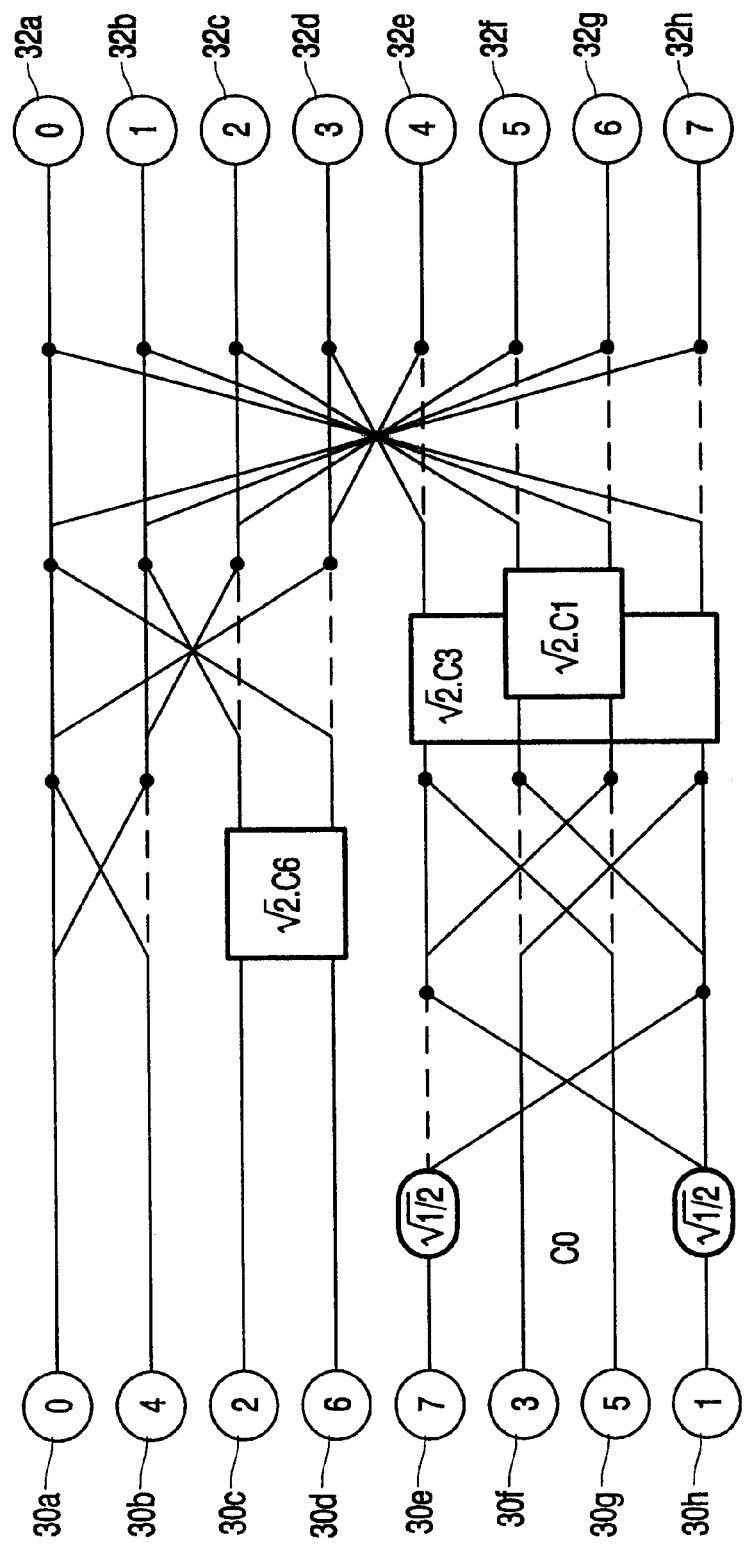
FIG. 2 shows an example of a data-flow diagram for an implementation of an 8 point one dimensional IDCT.

FIG. 2 shows an example of a data-flow diagram for an implementation of an 8 point one dimensional IDCT. The data-flow diagram is based on expressions described in an article published by C.Loeffler, A.Ligtenberg and G. Moschytz, titled "Practical Fast 1-D DCT Algorithms with 11 multiplications", published in Proceedings International Conference on Acoustics, Speech and Signal Processing 1989 (IC-IASSP '89) pages 988–991. At the left, nodes 30a–h symbolize the numbers by means of the value of the index v at positions v=0.7 in the row that has to be transformed. At the right nodes 32a–h symbolize the transformed numbers by means of the value of the index j at positions j =0.7 in the transformed row. The lines from the nodes 32a–h symbolize data flow of the numbers to different operations and of data flow of the results from these operation to other operations or to the transformed numbers. The operations are symbolized as follows. A dot with two solid incoming lines symbolizes summation. A dot with one incoming solid line and one incoming dashed line symbolizes subtraction, the number flowing along the dashed line being subtracted from the number flowing along the solid line. A box with two inputs and two outputs symbolizes rotation and factorization, that is, the computation of $(X_1, Y_1)$ from $(X_0, Y_0)$ according to $X_1 = \alpha(X_0 \cos\phi - Y_0 \sin\phi)$ $Y_1 = \alpha(X_0 \cos\phi + Y_0 \cos\phi)$ The value of the factor a and an identification of the angle $\phi$ are noted on the box; these are predetermined values: the blocks can be implemented using four multiplication's, an addition and a subtraction (alternatively three multiplication's and three additions can be used).

In one implementation at least one functional unit is provided which is capable of executing a row-IDCT instruction that causes that functional unit to IDCT-transform the contents of the segments of its operands. In the example of an 8-point IDCT with four segments in each a register, this would require two operands to transform a row. Such an instruction requires two result registers in which the numbers that represent the transformation are written in respective segments according to their frequency position in the transformation.

Figure 3:
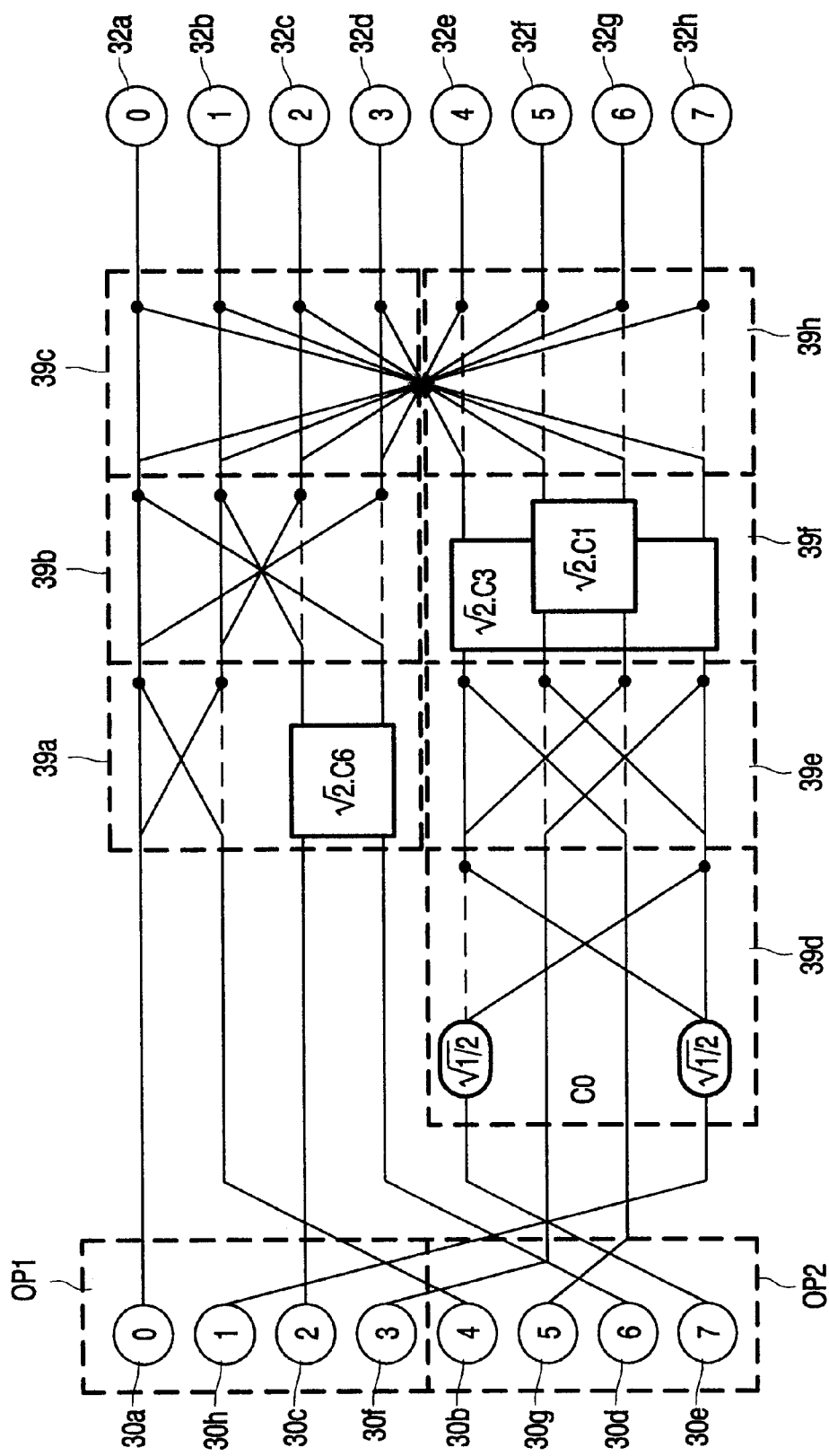
FIG. 3 shows a data flow diagram of instructions according to the invention.

Execution of the IDCT by such a functional unit is much faster than execution by means of individual instructions at least because the combination of numbers stored in segments at different positions in the operands can be realized by wiring in the functional unit. This wiring is specific to the IDCT. In addition, the data-flow diagram of FIG. 3 shows that a considerable amount of parallelism is possible in such a functional unit, so the speed of execution can be increased further by parallel execution of a number of operations.

Thus, the 2-dimensional IDCT transformation can be performed for the columns using arithmetic SIMD instructions to apply a one-dimensional IDCT-transformation to a number of columns in parallel and for the rows using a different, dedicated IDCT instruction to apply a functionally identical IDCT-transformation to a row.

Some processor architectures require that functional units use a standard instruction format, typically containing an opcode, two source register references and a result register reference. In this case each functional unit may have two ports connected to read ports of the register file and one port connected to a write port of a register file. In case of an IDCT instruction which transforms numbers stored in more than one register, more than one result register will be needed to write the transformed numbers. In architectures that allow only one result register this may be realized in various ways, for example by writing the results time-sequentially in logically adjacent result registers. Alternatively, one may use a combination of two instructions issued in parallel to the functional units. Such two instructions would normally be used for two different functional units in parallel. Instead, one uses the combination of the two instructions to program one functional unit that performs IDCT. By using this combination of two instructions, two separate result registers can be specified. In a processor that provides a write port to the register file for each of the instructions that is issued in parallel it is moreover ensured in this way that a write port to the register file is available for both results.

Alternatively, one might define two different types of instruction for the functional units, one for generating half the numbers in a register and another one for generating the other half of the numbers.

More generally, one may provide several dedicated instructions for respective parts of the computation of the IDCT, none of the instructions requiring more than a maximum number (e.g. one) of result registers. In order to select such instructions, one may split the IDCT data-flow diagram into sub-diagrams and assign a dedicated instruction to each sub-diagram. By selecting only sub-diagrams with a limited number of outputs it can be ensured that no more than one result register is required for any of the dedicated instructions.

FIG. 3 shows an example of a split-up into sub-diagrams indicated by dashed boxes 39a–g. Each of these boxes defines the data-flow of a number of a dedicated instructions which provide combinations of operations that are executed in parallel to help speed up the computation of transformation. The required number of segments in the results of each instruction is limited to four. These instructions are especially defined so that the locations of numbers in respective segments correspond to the location required for the SIMD transformation, that is, with the numbers indicated by v=0.3 at the left of FIG. 3 in respective segments of a first register R1 and the numbers indicated by u=4.7 in respective segments of a second register R2.

A first example of a first instruction INS1 R1,R2,R3 corresponding to a first dashed box 39a refers to the two registers R1, R2 as operands. This instruction causes a functional unit to perform the following operations in parallel:

Sum the number (v=0) in a first segment of the first register R1 to the number (v=4) in the first segment of the second register R2. The result is placed in a first segment of a result register R3.

Subtract the same numbers from one another and place the result in a second segment of the result register R3.

Use the numbers in a third segment (v=2) of the first register R1 and the third segment of the second register R2 as $X_0$ and $Y_0$ in a rotation with a factor sqrt(2) and a predetermined sine and cosine value. Place the resulting $X_1$, $Y_1$ are in the third and fourth segment of the result register.

Figure 4B:
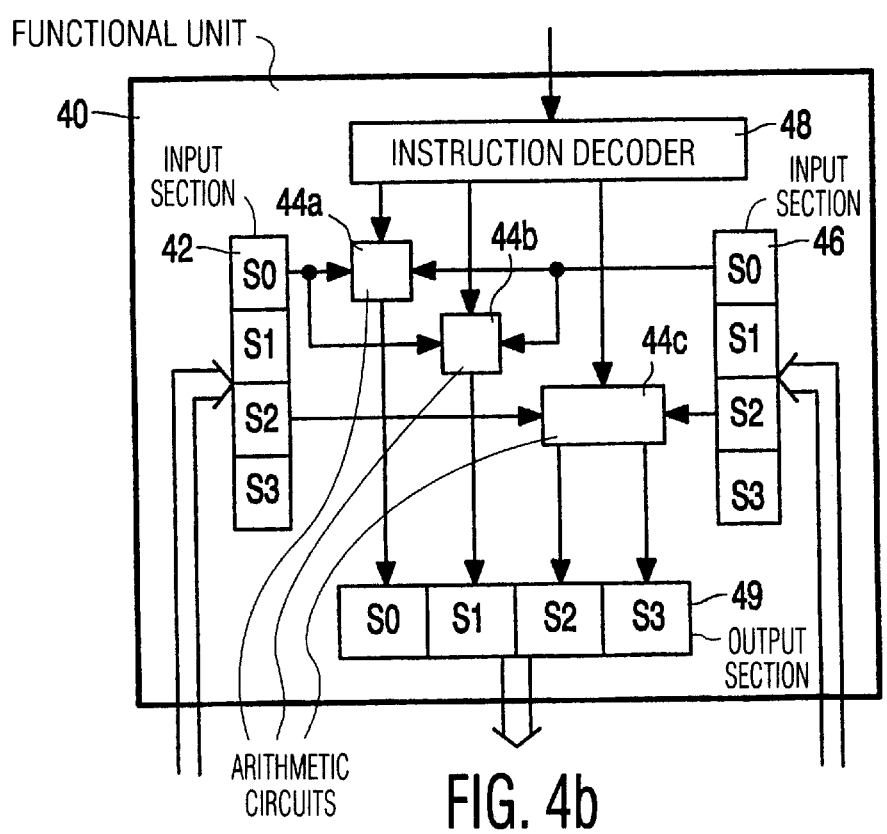

FIG. 4b shows an example of a functional unit 40 for executing the INS1 instruction. The functional unit 40 contains two input sections 42, 46 for receiving the content of the first register R1 and the second register R2 respectively, an instruction decoder 48 for setting the functional unit into action, and arithmetic circuits 44a–c for computing the sum of the first segment S0 of R1 and R2, the difference of the first segment of R1 and R2 and the rotation of the third segment S2 of R1 and R2. The results of these computations is combined into the segments S0–S3 of an output section 49 for writing into the result register R3.

A second example of a second instruction INS2 R3,R4 corresponding to a second dashed box 39b refers to one register R3 as operand. This instruction causes a functional unit to perform the following operations in parallel:

Sum the numbers stored in the first and fourth segment of the operand register R3 and place the result in a first segment of a result register R4

Sum the numbers stored in the second and third segment of the operand register R3 and place the result in a second segment of a result register R4

Subtract the number in the third segment of the operand register R3 from the number in the second segment of the operand register R3 and place the result in the third segment of the result register R4.

Subtract the number in the fourth segment of the operand register R3 from the number in the first segment of the operand register R3 and place the result in the fourth segment of the result register R4

FIG. 4a shows an example of a functional unit 20 for executing the INS2 instruction. The functional unit 20 contains an input section, for receiving the content of the operand register R3, arithmetic units 24a–b, 25a–b for computing the sums and subtractions; an instruction decoder 28 for setting the functional unit 20 into action and an output section 26. The results of the sums and subtractions is combined into the segments S0–S3 of the output section 26 for writing into the result register R4.

A third example of a third instruction INS3 R4,R5,R6 corresponding to a third dashed box 39c refers to two registers R4, R5 as operands. This instruction causes a functional unit to perform the following operations in parallel:

Sum the numbers stored in the first segment of the first operand register R4 and the fourth segment of the operand register R5 and place the result in the first segment of the result register R6

Sum the numbers stored in the second segment of the first operand register R4 and the third segment of the second operand register R5 and place the result in the second segment of the result register R6

Sum the numbers stored in the third segment of the first operand register R4 and the second segment of the second operand register R5 and place the result in the third segment of the result register R6

Sum the numbers stored in the fourth segment of the first operand register R4 and the first segment of the second operand register R5 and place the result in the fourth segment of the result register R6

A fourth example of a fourth instruction INS4 R4,R5,R6 corresponding to a dashed box 39h refers to two registers R4, R5 as operands. This instruction causes a functional unit to perform the following operations in parallel:

Subtract from the number stored in the first segment of the first operand register R4 the number stored in the fourth segment of the operand register R5 and place the result in the fourth segment of the result register R6

Subtract from the number stored in the second segment of the first operand register R4 the number stored in the third segment of the second operand register R5 and place the result in the third segment of the result register R6

Subtract from the number stored in the third segment of the first operand register R4 the number stored in the second segment of the second operand register R5 and place the result in the second segment of the result register R6

Subtract from the number stored in the fourth segment of the first operand register R4 the number stored in the first segment of the second operand register R5 and place the result in the fourth segment of the result register R6

A fifth example of a fifth instruction INS5 R1,R2,R7 corresponding to a fourth dashed box 39d refers to two registers R1, R2 as operands. This instruction causes a functional unit to perform the following operations in parallel:

Place the numbers from the fourth segment of the first source register R1 and the second segment of the second source register R2 into the second and third segment of the result register R7 respectively.

Use the numbers in a third segment (v=2) of the second register R2 and the second segment of the first register R1 as $X_0$ and $Y_0$ in a rotation with a factor 2 and a predetermined sine and cosine value (corresponding to 45 degrees). Place the resulting $X_1$, $Y_1$ are in the third and fourth segment of the result register. (This rotation can be implemented using fewer multiplication's because the sine and cosine of 45 degrees are equal to each other).

A sixth example of a sixth instruction INS6 R7,R8 corresponding to a sixth dashed box 39e refers to one register R7 as operand. This instruction causes a functional unit to perform the following operations in parallel:

Sum the numbers stored in the first and third segment of the operand register R7 and place the result in a first segment of a result register R8

Sum the numbers stored in the second and fourth segment of the operand register R7 and place the result in a fourth segment of a result register R8

Subtract the number in the third segment of the operand register R7 from the number in the first segment of the operand register R7 and place the result in the third segment of the result register R8

Subtract the number in the second segment of the operand register R7 from the number in the fourth segment of the operand register R7 and place the result in the second segment of the result register R8

A seventh example of a seventh instruction INS7 R8,R9 corresponding to a seventh dashed box 39f refers to one register R8 as operand. This instruction causes a functional unit to perform the following operations in parallel:

Use the numbers in a first and fourth segment of the source register R8 and as $X_0$ and $Y_0$ in a rotation with a factor sqrt(2) and a predetermined sine and cosine value. Place the resulting $X_1$, $Y_1$ are in the first and fourth segment of the result register R9.

Use the numbers in a second and third segment of the source register R8 and as $X_0$ and $Y_0$ in a rotation with a factor sqrt(2) and a predetermined sine and cosine value. Place the resulting $X_1$, $Y_1$ are in the second and third segment of the result register R9.

In these instructions numbers may be represented in the registers as fixed point numbers, all with the same number of bits, so that on multiplication a number of least significant bits are discarded. Almost all fixed point numbers may be defined to be in a range from +1 to −1. An exception are the results of the rotation/scalings, which are preferably fixed point numbers in a range from −2 to 2. It has been found that only insignificant accuracy is lost through rounding when one uses this representation of the numbers and when the data flow graph is split into instructions as described above. Preferably, the additions and/or multiplications in these instructions provide for clipping of results of these instructions if the magnitude of the result exceeds the range of values that can be held in the registers. However, it has been found that if the data flow graph is split into instructions in the way shown above, clipping is not normally necessary.

When the data processing device provides for all of these instructions the 8-point IDCT of a row contained in the segments of two registers R1, R2 can be programmed with the following program:

INS1 R1,R2,R3

INS2 R3,R4

INS5 R1,R2,R7

INS6 R7,R8

INS7 R8,R9

INS3 R4,R9,R5

INS4 R4,R9,R6

As a result the numbers making up a row of the IDCT transform will be contained in the segments of register R5,R6. To transform a complete block these instructions must be repeated for the other rows, with other registers as far as necessary. Needless to say that in a VLIW processor, with more than one functional unit, although all these instructions INS1-INS7 may be instructions for the same single functional unit, it is also possible that these instructions may be executed by different functional units. For example, specialized functional units might be provided for the instructions which involve multiplication on one hand and instructions which involve only additions and subtractions on the other hand.

Different grouping of operations into instructions is also possible. For example, one may combine for example the operations of INS1 and INS2 into one instruction INSA so that execution of INSA R1,R2,R4 is functionally equivalent to successive execution of INS1 R1,R2,X; INS2 X,R4; similarly INS5, INS6, INS7 may be combined into an instruction, so that execution of INSB R1,R2,R9 is equivalent to successive execution of INS5 R1,R2,X; INS6 X,Y; INS7 Y,R9. The instructions INS3 and INS4 can be replaced by SIMD additions and subtraction respectively, when the instruction INS7 is modified so that it puts its results into the segments of the result register in reverse order. However, in this case an additional "reverse order" instruction, which exchanges the contents of segments 0–3 with each other and the contents of segments 1–2 with each other is required. This instruction must applied to the result of the SIMD version of INS4 to get the transformed number in the proper order.

The number of instructions that needs to be executed to transform the block can be reduced by providing one or more functional units which accept the instructions INS1–INS7 and execute the operations in parallel combining different segments of the one or more operands referenced in the instruction. This reduces the time (number of instruction cycles) needed for the transform. Execution of the IDCT by such a functional unit is much faster than execution by means of individual instructions at least because the combination of numbers stored in segments at different positions in the operands can be realized by wiring in the functional unit. This wiring is specific to the IDCT. Of course, a reduction in the required time is already achieved if the functional units provide for only one of the additional instructions INS1–INS7 or any combination of these instructions. If one or more of these instructions are not provided for, their function can be implemented using conventional instructions.

Furthermore, the memory space needed for storing programs is reduced, in particular for programs which involve transformations. This benefit would of course be realized even if the operations in an instruction were not executed in parallel. The reduced program space would result from instructions that involve arbitrary combinations of operations. The particular combinations INS1–INS7, however, are not arbitrary: they have the special property that they provide operations that combine segments as required for computing the IDCT, so as to speed up processing and that furthermore they combine operations that can be executed in parallel to increase the speed of computing the IDCT even further.

The examples given above use registers with four segments to implement an 8-point two-dimensional IDCT, e.g. 64-bit registers with four 16 bit segments. Of course, the invention is not limited to these numbers. One may use segments of a different size, e.g. 8,12 or 32 bit segments (the segment need not fill the entire register) and/or registers with a different number of bits, e.g. 128-bits. In the latter case a register with 16-bit segments can store 8 numbers, for example an entire row of an 8-bit block and the 8-point IDCT can be executed as an instruction that requires only one operand register and one result register.

More generally, any kind of program can be speeded up by providing functional units which are capable of executing dedicated instructions involving (preferably parallel) execution of operations which combine operands stored in segments at different positions in the registers. The separable transforms discussed in the preceding are but an example of this. For a given program, suitable dedicated instructions can be found by analyzing the data-flow of the program and isolating often occurring combinations of operations that combine different segments of the same one or two operands. When a suitable instruction is found the instruction decoder 120 and the switch circuit 125 are designed so that the functional unit is capable of handling that instruction.

Preferably these dedicated instructions are combined with a set of SIMD instructions. In this case, one or more functional unit either together or individually provide a complete set of arithmetic instructions is provided with SIMD data flow (combining pairs of segments at corresponding positions in the operands). In addition at least one functional unit is capable of executing a few selected instructions that combine segments at different positions in one or more operands of the instruction, different, that is, than in the SIMD instruction.

This is particularly useful for any kind of separable transformations, not only for the IDCT. Use can be made of this in for example, 2-dimensional fourier transforms or Hadamard transforms, convolutions with 2-dimensional separable kernels (such as a Gaussian kernel) H(x,y) which can be written as H1(x)H2(y) etc and higher than two dimensional transformations or convolutions. In general, a separable transform uses a one dimensional transformation which takes a series of numbers as input and defines a new series of numbers as output. A separable transformation comprises the composition of two such one-dimensional transformations. A first one-dimensional transformation is computed for each of a set of series, producing a set of new series. A second transformation is computed for a transversal series obtainable by taking numbers from corresponding positions in series from the set of new series.

In each of these cases, the numbers that have to be transformed may be stored in segments of operands, the position of the segment in which a number is stored being determined in the same way for each row by the column in which the number is located, the numbers in each operand belonging to the same row. The transformation can then be executed in the row direction using the dedicated instructions and a number of times in parallel in a direction transverse to the rows by means of SIMD instructions.

What is claimed is:

1. A data processing device comprising
an operand storage circuit for storing operands, each subdivided into a plurality of segments at respective positions in the operand;
an instruction execution unit for executing an instruction containing one or more operand references, each referring commonly to the segments of a respective source operand in the operand storage circuit, said instruction causing the instruction execution unit to execute a plurality of operations in parallel and independently of one another, each operation combining predetermined segments from one or more of the respective source operands, characterized in that at least one of the operations combines segments that have mutually different positions in the one or more respective source operands and/or that at least one of the operations differs from the other operations.

2. A data processing device according to claim 1, wherein said instruction is referred to as a cross instruction, the instruction execution unit also being arranged for executing a parallel instruction containing two or more further operand references each referring commonly to the segments of a respective source operand in the operand storage circuit, said parallel instruction causing the instruction execution unit to execute a plurality of operations in parallel and independently of one another, each operation combining predetermined segments from the source operands having mutually corresponding positions in the two or more referenced further source operands.

3. A data processing device according to claim 2, programmed with a program for computing a composition of a column transformation and a row transformation of a matrix having at least rows and columns,
the column transformation transforming columns each according to a one dimensional column transformation, the column transformation being executed using the parallel instruction, the two or more operands each storing information items for different columns in respective segments according to the column;
the row transformation transforming rows each according to a one dimensional row transformation, the row transformation being executed using the cross instruction, information items for the same row being stored in respective segments of the at least one operand.

4. A data processing device according to claim 3, where the row and column transformation correspond to the same one-dimensional transformation.

5. A data processing device according to claim 1, wherein the operations caused by the instruction comprise computing a sum and a difference of two segments in one of the one or more source operands.

6. A data processing device according to claim 1, wherein the operations caused by the instruction result in the computation of a plurality of component coefficients of a vector transformation, such as an IDCT or DCT, of the numbers stored in the respective segments of the one or more source operands, the data processing device storing the component coefficients in segments at respective positions of a result operand commonly referred to by the instruction.

7. A data processing device according to claim 6, wherein the numbers stored in the segments of two or more of the source operands make up an input vector, which is transformed, the component coefficients of the transformation of the input vector being stored in the segments of two or more result operands.

8. A method of transforming a matrix having at least rows and columns using a processor having segmented operand storage circuits, the method comprising:
computing a composition of a column transformation and a row transformation,
the column transformation transforming columns each according to a one dimensional column transformation, the column transformation being executed using at least one SIMD instruction which causes the processor to process different columns in parallel, using information items for the different columns stored in respective segments of an operand storage circuit referred to in the SIMD instruction;
the row transformation transforming rows each according to a one dimensional row transformation, the row transformation being executed using at least one cross instruction which causes the processor to perform several operations upon information items for the same row in parallel, the information items for the same row being stored in respective segments of an operand storage circuit referred to in the cross instruction, wherein the row and column transformation correspond to the same one-dimensional transformation.

9. A computer readable medium storing a computer program for executing the method according to claim 8.

* * * * *